United States Patent [19]

Langston

[11] 4,168,096
[45] Sep. 18, 1979

[54] SIDE OPENING, SHIFTABLE COVER FOR TRUCKS OR WAGON BEDS

[76] Inventor: Larry D. Langston, 211 St. John, Vandalia, Mo. 63382

[21] Appl. No.: 816,325

[22] Filed: Jul. 18, 1977

[51] Int. Cl.² .............................................. B60P 7/02
[52] U.S. Cl. .................................................... 296/100
[58] Field of Search ........... 296/100, 107, 108, 120 R, 296/137 C; 135/4 A

[56] References Cited

U.S. PATENT DOCUMENTS

| | | | |
|---|---|---|---|
| 2,877,722 | 3/1959 | Peat | 296/100 |
| 3,231,305 | 1/1966 | Beckman | 296/100 |
| 3,379,468 | 4/1968 | Woodward | 296/100 |
| 3,773,379 | 11/1973 | Loiseau | 296/100 |
| 3,841,697 | 10/1974 | McFarland | 296/100 |

*Primary Examiner*—Robert R. Song

*Attorney, Agent, or Firm*—Schmidt, Johnson, Hovey & Williams

[57] ABSTRACT

A watertight cover for the open bed of a pickup truck has continuous flexible sheathing supported on a collapsible frame and pivot arms swingable with the frame for automatically and positively folding the end section of the cover when the frame is collapsed. The collapsible nature of the frame renders the cover shiftable transversely of the truck bed from a normal extended bed-enclosing position to a retracted position along one side of the bed for providing easy access thereto. In one embodiment, the cover is provided with remote-actuation mechanism including a central torque shaft operably coupled with the frame for collapsing and extending the latter in response to rotation of the shaft in the appropriate direction.

6 Claims, 13 Drawing Figures

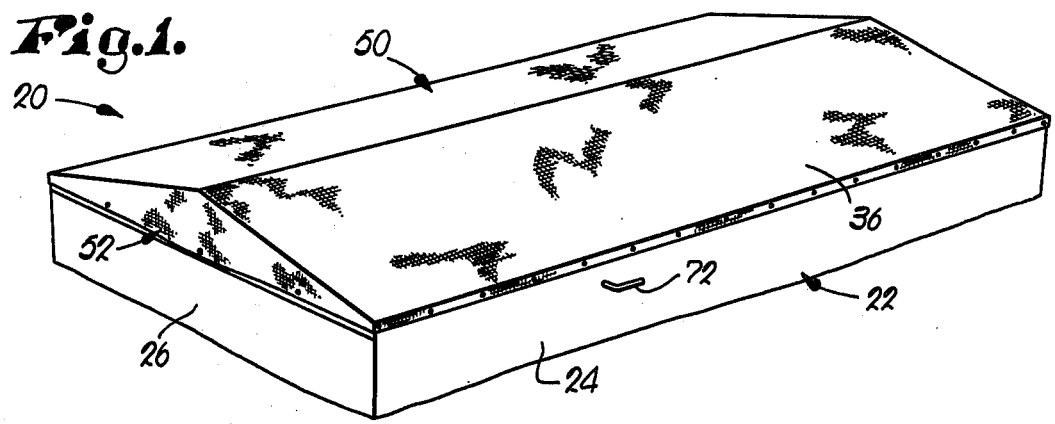
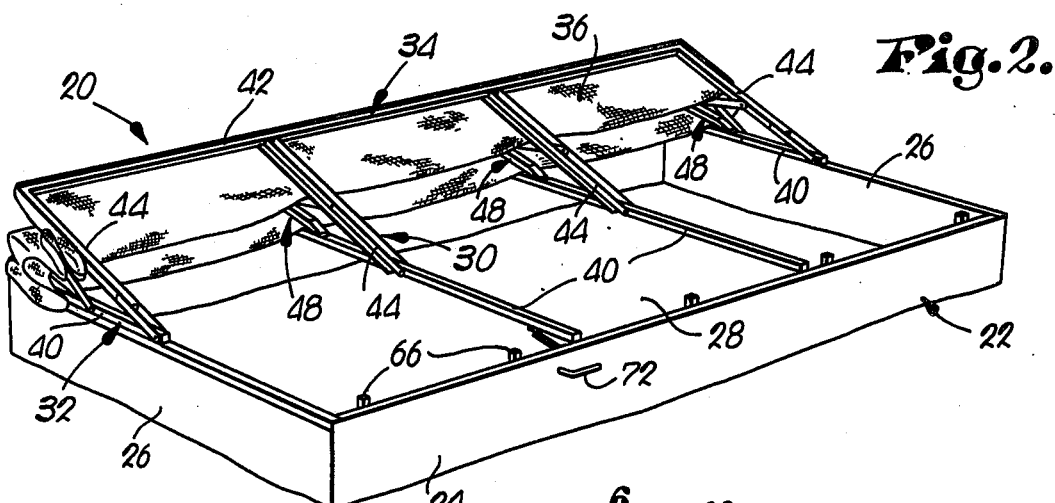
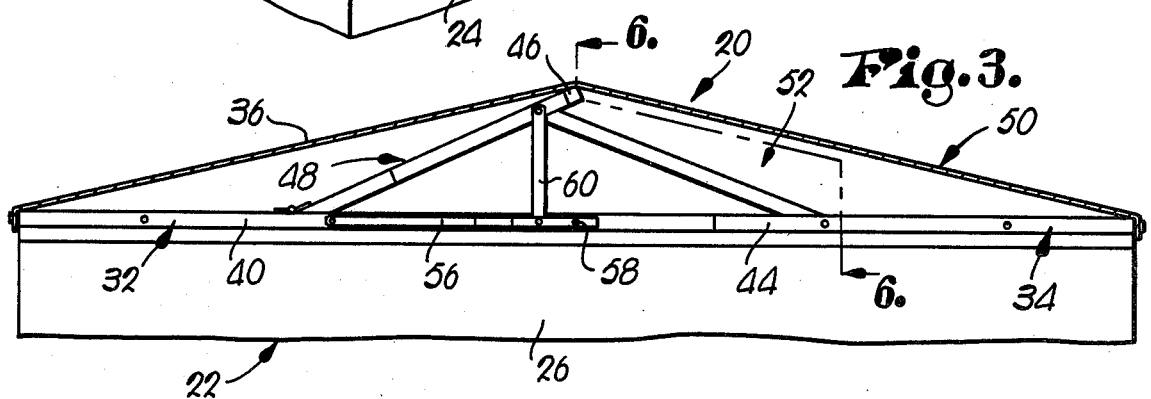
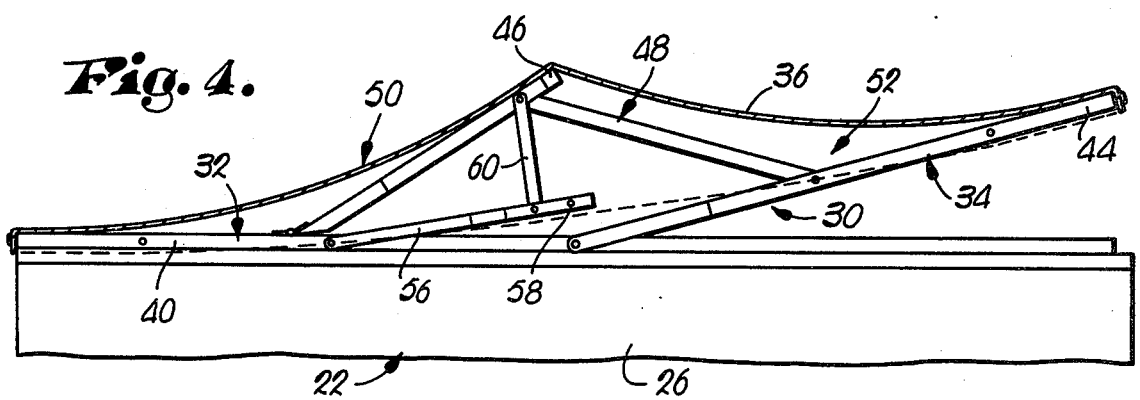

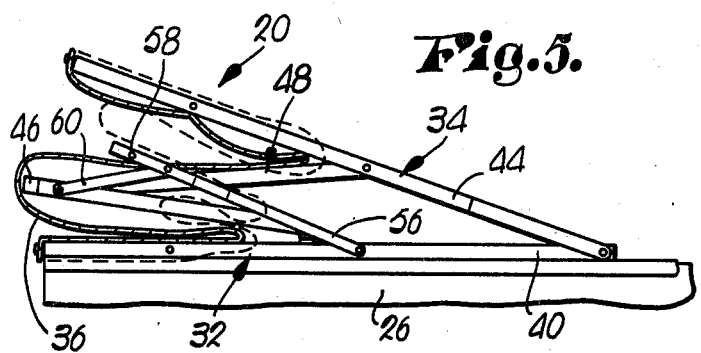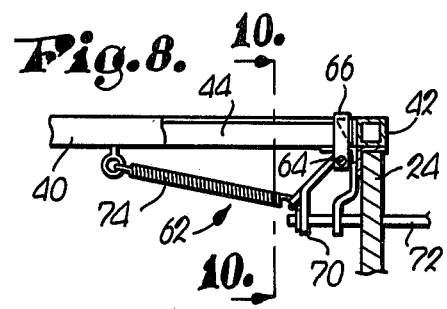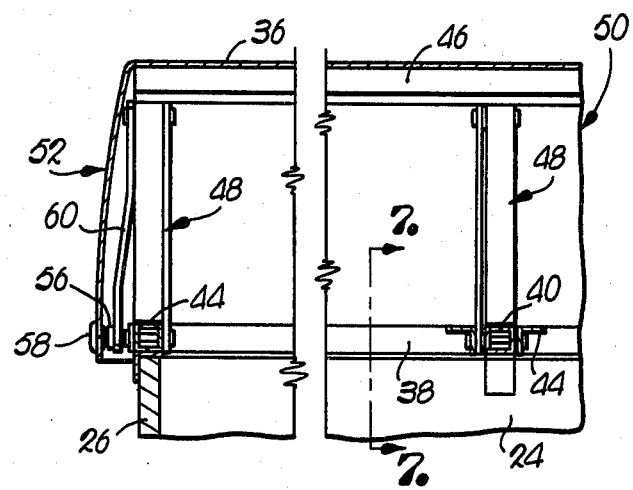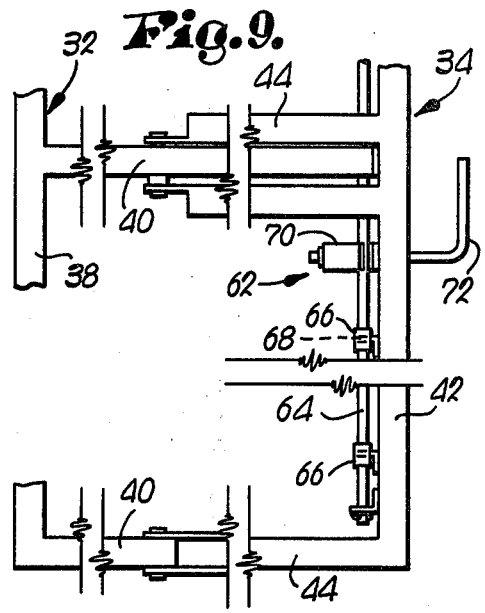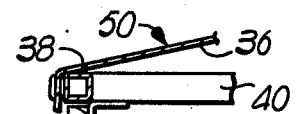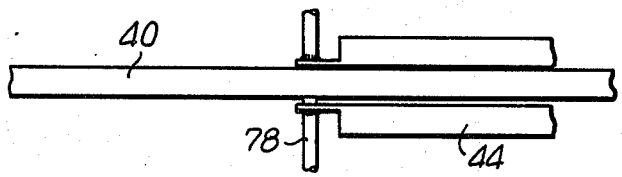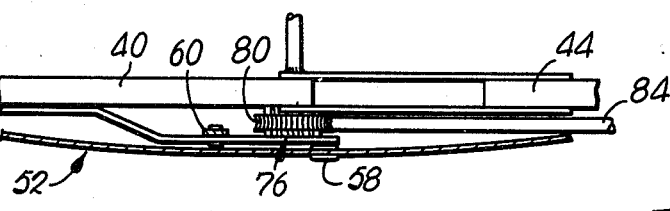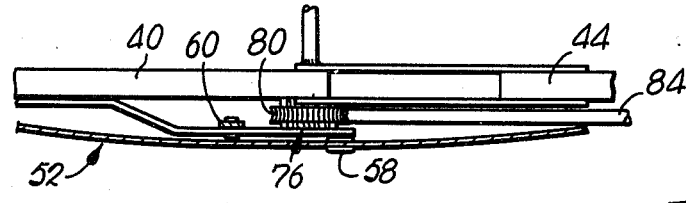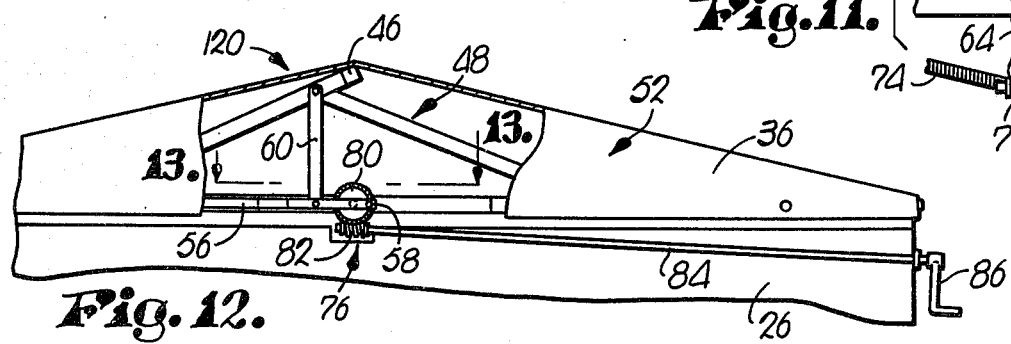

SIDE OPENING, SHIFTABLE COVER FOR TRUCKS OR WAGON BEDS

This invention relates to covering devices in general and particularly concerns a side-opening, watertight, shiftable cover adapted to enclose the open cargo bed of a truck or trailer.

Shiftable covers for trucks and other cargo carrying vehicles are known in the art as shown for example in the U.S. patent to McFarland U.S. Pat. No. 3,841,697 and Loiseau U.S. Pat. No. 3,773,379. Typically such devices comprise a flexible wrapper supported by a foldable frame for movement to and from a position overlying the truck bed. One problem with the prior art devices as disclosed in the patents is the fact that they open fore-and-aft of the vehicle such that as vehicle length increases, it becomes more and more awkward to manipulate the covers; this is particularly true of enclosures for large open semi-trailers for example. Moreover, the water shedding capability of these devices is not always adequate inasmuch as they do not present a continuous sloped roof of the type desired to assure complete water run-off.

One attempt to provide a gabled, side-opening, shiftable cover for truck beds is disclosed in the U.S. Pat. No. 3,379,468 to Woodward. This patent shows a pair of laterally swingable panels including endsections which automatically swing out to define the "gables" of the unfolded cover. A problem with the Woodward device is its multi-panel construction which renders it totally unsuited for use as a water-tight cover. The principles employed by Woodward in his cover actually teach away from watertight application inasmuch as there is presented a discontinuous seam extending along the apex of the cover and into the gable defined by the end panel.

Accordingly, it is an important object of the present invention to provide a shiftable, watertight sloped cover for the cargo bed of a load carrying vehicle.

It is another important object of my invention to provide a side opening cover including a laterally shiftable frame and continuous flexible sheathing supported thereupon for movement toward and away from a position overlying the open bed of a truck or the like.

In accordance with the foregoing objects, it is yet another important object of the instant invention to provide a watertight, pitched cover as above wherein the end panels of the cover are positively and automatically folded and unfolded in response to shifting movement of the supporting frame.

In the drawings:

FIG. 1 is a perspective view of a side opening, shiftable cover for trucks, constructed in accordance with the principles of the present invention;

FIG. 2 is a perspective view showing the cover in its open position;

FIG. 3 is an enlarged, transverse cross-sectional view showing the cover in its closed position;

FIG. 4 is an enlarged, transverse cross-sectional view showing the cover in a partially opened position;

FIG. 5 is an enlarged, fragmentary, end view of the cover in its folded position;

FIG. 6 is a fragmentary, enlarged, cross-sectional view taken along line 6—6 of FIG. 3.

FIG. 7 is an enlarged, fragmentary cross-sectional view taken along line 7—7 of FIG. 6;

FIG. 8 is an enlarged, fragmentary transverse cross-sectional view showing the details of construction of the release mechanism;

FIG. 9 is an enlarged, fragmentary plan view of the release mechanism;

FIG. 10 is an enlarged, fragmentary cross-sectional view taken along line 10—10 of FIG. 8;

FIG. 11 is an enlarged, fragmentary cross-sectional view similar to FIG. 8 showing the cover in a partially open position;

FIG. 12 is an enlarged, fragmentary end view of a second embodiment of the present invention and having portions broken away for clarity; and FIG. 13 is a fragmentary, enlarged, cross-sectional view taken along line 13—13 of FIG. 12.

Throughout the drawings, there is shown a watertight, shiftable cover 20 mounted on an elongate, open bed 22 of a drayage vehicle (not shown). The bed 22 has a pair of parallel, opposed sidewalls 24, parallel, laterally offset endwalls 26 extending between the sidewalls 24 and an open top 28 bounded by the sidewalls 24 and endwalls 26.

The cover 20 has a collapsible frame 30 including a stationary section 32 and a swingable section 34 pivotally supported on the section 32. A continuous expanse of flexible sheathing 36 is releasably secured to the frame 30 around its periphery by a plurality of conventional snap fasteners or the like. The frame 30 is shiftable laterally of the bed from an extended position overlying top 28 to a retracted position wherein the swingable section 34 folds over the stationary section 32 along one of the sidewalls 24 as shown in FIG. 2.

The stationary section 32 comprises an elongate stringer member 38 adapted to be mounted along the top of one sidewall 24 in fore-and-aft extending relation to the bed 22, and a number of parallel crosspieces 40 extending perpendicularly from the stringer member 38 at spaced locations therealong. Each crosspiece 40 spans the distance between the sidewalls 24 when the cover 20 is mounted on the bed 22.

The swingable section 34 has an elongate stringer member 42 extending parallel to the member 38, and a plurality of struts 44 extending perpendicularly from the member 42, each strut 44 being pivotally secured to a respective crosspiece 40 mid-length of the latter. Additionally, the section 34 includes a ridgepole 46 which extends parallel to the stringer members 38, 42 and is coupled with each crosspiece 40 and its respective strut 44 by an equal number of scissor linkages 48.

When the frame 30 is in its extended position, as shown for example in FIGS. 1 and 3, the ridgepole 46 is disposed within a plane spaced vertically above the stringer members 38, 42 such that the sheathing 36 is supported in a manner to define a bed-enclosing shelter having a gabled roof configuration and presenting a pair of upwardly facing, anticlined roof panels 50 and an opposed pair of substantially upright, unitary end panels 52.

Each end panel 52 is generally triangular in shape and has a lowermost periphery 54 extending between its lateral bounderies defined by the stringer members 38, 42. When the frame 30 is in its extended position, as shown for example in FIG. 1, the peripheries 54 span the distance between the sidewalls 24 at the top of respective endwalls 26 such that the cover 20 completely encloses the top 28 of bed 22. In order to positively fold and unfold the panels 52 in response to movement of the frame 30, each panel 52 is provided with a pivot arm 56 mounted at one end to a respective crosspiece 40 and at its opposite end to the periphery 54 mid-length of the latter by a snap fastener 58. Each arm 56 is operably coupled to the swingable section 34 by a link 60 extending between a point on the arm 56 adjacent fastener 58 and a respective scissor linkage 48. Hence, when the frame 30 is collapsed to move the cover 20 to its retracted position, each arm 56 swings counterclockwise from its normal horizontal position as shown in FIG. 3 to a folded position shown in FIG. 5 causing desired folding of the end panels 52 by virtue of their attachment to the respective arms 56 along peripheries 54.

As shown in FIGS. 8-11, there is provided a latching mechanism 62 including a fore-and-aft extending torque shaft 64 rotatably supported by the stationary section 32 along the sidewall 24 remote from the stringer member 38, a plurality of U-shaped keepers 66 spaced along the length of shaft 64, and an equal number of similarly positioned catches 68 mounted along the length of stringer member 42 and adapted to be releasably received within respective keepers 66. A crank 70 on the torque shaft 64 is operably coupled with a manually engageable handle 72 for permitting rotation of the shaft 64 in a direction to release catches 68 from the keepers 66 when it is desired to move the cover to its retracted position. A tension spring 74 extends between the crank 70 and one of the crosspieces 40 for the purpose of biasing the shaft 64 toward a latching position as shown for example in FIG. 8.

A second embodiment of the present invention is shown in FIGS. 12-13 wherein a shiftable cover 120, substantially identical to the shiftable cover 20, is additionally provided an operating mechanism 76 for retracting and extending the shiftable cover 120. The mechanism 76 includes a central, fore-and-aft extending shaft 78 which is rigidly secured to each of the struts 44 and pivotally couples the latter to their respective crosspieces 40 such that the section 34 is swingable laterally of the bed 22 to collapse the frame 30.

A worm gear 80 is carried at one end of the shaft 78 in meshing engagement with a single threaded worm 82 supported on one end of a screw rod 84. The rod 84 is rotatably supported along an endwall 26 and is provided with a manually manipulatable crank 86 adjacent one sidewall 24 such that the worm 82 and worm gear 80 can be conveniently actuated to rotate the shaft 78 in an appropriate direction for retracting or extending the cover 120.

In use, the cover 20 is normally disposed in its extended position as shown in FIG. 1 such that the open top 28 of the bed 22 is securely enclosed. The stringer members 38,42 cooperate with the ridgepole 46 to support the sheathing 36 in such a manner that there is presented a gabled roof defined by the oppositely sloped roof panels 50 and the end panels 52. Thus, the cargo carried within the bed 22 is sealed against escapement during operation of the drayage vehicle and furthermore, the bed 22 is protected against entry of rain, snow and other weather elements through the open top 28.

When it is desired to gain access into the bed 22 either for loading or unloading, it is but necessary to pull outwardly on the handle 72 thereby releasing keepers 66 and then to simply swing the section 34 laterally over-center until it rests in a folded position on top of the stationary section 32 adjacent the stringer member 38. With the cover 20 in this retracted position, the operator is provided with virtually unobstructed access to the bed 22 such that material can be quickly and easily loaded or unloaded through the open top 28. Note particularly that the end panels 52 are automatically moved to an out-of-the-way folded position by the operation of the pivot arms 56, it being unnecessary to unsnap or otherwise release any portion of the flexible sheathing 36 from the frame 30. Thus, shifting movement of the cover 20 can be quickly and easily accomplished by only one man without risking damage to the flexible sheathing 36.

When it is again desired to close the open top 28 with the cover 20, it is a simple matter to return the swingable section 34 to its original position wherein frame 30 is extended over the bed 22. As the section 34 is swung clockwise from the cover-retracted position shown in FIG. 5 to the cover-extended position shown in FIG. 3, the pivot arms 56 are also moved in a clockwise direction and function to positively and automatically unfold the end-panels 52 such that they once again assume their triangular shape without need of attention on the part of the operator. Hence, once the frame 30 is fully extended and the latching mechanism 62 is engaged, the cover 20 is positioned for immediate use without additional tieing, snapping, or other fastening operations.

The operation of the second embodiment of my invention is virtually the same as that described above with the exception that the cover 120 is retracted and extended in response to actuation of the operating mechanism 76. In this connection, it will be appreciated that manual rotation of the crank 86 will effect swinging movement of the section 34 by virtue of the motion transmitted through the worm gear 80 and worm 82. In this manner, the operator can open and close the cover 120 while remaining in a fixed position.

From the above, it is clear that the present invention offers a significant improvement over known shiftable covers for the open bed of trucks and other cargo carrying vehicles. The arrangement of the section 34 for lateral over-center swinging movement renders the cover 20 side opening such that access into the bed 22 is extremely convenient. Moreover, this side opening feature of the cover 20 is also beneficial from the standpoint that increased length of the bed 22 does not require ever increasing bunching of the flexible sheathing 36 as is the case with fore-and-aft opening covers. That is to say, cover 20 can be modified to accommodate a longer bed 22 by simply lengthening the collapsible frame 30 such that when folded the additional required flexible sheathing 36 can be neatly folded along the increased length of the frame 30. On the other hand, with devices that fold fore-and-aft, as the length increases, the necessary increased expanse of the flexible wrapper must be folded at one or both ends of the frame and can not be accommodated by increasing the width of the frame.

Perhaps more importantly, the automatic unfolding of the end-panels 52 provided by the pivot arm 56 makes opening and closing of the cover 20 an extremely simple operation that can be accomplished easily by only a single operator. This feature of the present invention is even more significant when it is considered that the end-panels 52 are of unitary construction for the purpose of rendering the cover 20 substantially watertight when it is positioned over the opening 28 of bed 22.

The operating mechanism 76 shown in the alternate embodiment of my invention makes oening and closing of the cover 120 even more convenient for the operator.

By arranging the rod 78 centrally of the bed 22, the forces required to swing the section 34 are more evenly balanced thereby limiting the stresses on operating mechanism 76 as well as reducing the amount of effort required on the part of the operator to open and close the cover 120.

I claim:

1. A shiftable watershedding cover for the open bed of a drayage vehicle, said cover including:

a collapsible frame adapted to be mounted on said bed for movement to and from a normal extended position overlying the latter, a continuous expanse of flexible sheathing mounted on said frame and moveable therewith to define a retractable, bed-enclosing shelter, said shelter including an upwardly facing roof panel and a pair of opposed, substantially upright unitary end panels depending from said roof panel; and means for positively and automatically folding said end sections when said frame is collapsed, said folding means being operable to unfold said end panels when the frame is moved to said extended position, said frame having a stationary section, and a moveable portion swingably supported on said stationary section, said folding means including an arm for each end panel, said arms being pivotally mounted on said stationary section and operably coupled with said moveable section to permit swinging of the arms therewith.

2. The shiftable cover of claim 1, each of said arms being secured by a single fastener to a respective end panel.

3. The shiftable cover of claim 2, said fastener being disposed substantially equidistant from the lateral boundaries of said panel.

4. The shiftable cover of claim 1; and a latching mechanism for releasably holding said frame in the extended position, said mechanism including a plurality of keepers shiftably mounted on said stationary section and a catch for each keeper mounted on said swingable section and adapted to be releasably engaged by respective said keepers.

5. A shiftable cover for the open bed of a drayage vehicle, said cover including:

a collapsible frame adapted to be mounted on said bed; an expanse, of flexible sheathing secured to said frame; and mechanism for selectively extending or collapsing said frame, said frame including a stationary section and a shiftable section, said mechanism having a shaft rotatably mounted on said stationary section and rigidly secured to said shiftable section whereby rotation of said shaft effects relative movement between said sections, said mechanism being provided with a manually manipulable crank operably coupled with said shaft for convenient actuation of the latter.

6. The shiftable cover of claim 5, said mechanism including a worm gear on said shaft and a mating worm coupled with said crank.

* * * * *